United States Patent
Jaffe et al.

[11] Patent Number: 5,869,625
[45] Date of Patent: Feb. 9, 1999

[54] COLORANT BLENDS CONTAINING A SALT-FORMING AZO PIGMENT AND A PYRROLOPYRROLE PIGMENT

[75] Inventors: Edward Ephraim Jaffe; James Martin Delaney, both of Wilmington, Del.

[73] Assignee: Ciba Specialty Chemical Corporation, Tarrytown, N.Y.

[21] Appl. No.: 842,294

[22] Filed: Apr. 23, 1997

Related U.S. Application Data

[63] Continuation of Ser. No. 475,131, Jun. 7, 1995, abandoned, which is a continuation-in-part of Ser. No. 378,145, Jan. 24, 1995, abandoned.

[51] Int. Cl.$^6$ ............................... C09D 5/00; C09D 7/12
[52] U.S. Cl. ........................... 534/DIG. 1; 8/638; 8/639; 106/494
[58] Field of Search .................. 534/573 M; 608/639, 608/638; 106/447

[56] References Cited

U.S. PATENT DOCUMENTS

| | | | |
|---|---|---|---|
| 2,508,448 | 5/1950 | Brizzolara | 260/40 |
| 4,415,685 | 11/1983 | Igbal et al. | 524/92 |
| 4,579,949 | 4/1986 | Rochat et al. | 546/167 |
| 4,783,540 | 11/1988 | Bäbler | 548/453 |
| 4,791,204 | 12/1988 | Jost et al. | 548/101 |
| 4,810,304 | 3/1989 | Jaffe et al. | 106/494 |
| 4,844,742 | 7/1989 | Jaffe | 106/448 |

FOREIGN PATENT DOCUMENTS 0535774  4/1993  European Pat. Off. .

OTHER PUBLICATIONS

S. Panush, Jouranl of Coating Tech. vol. 52, 51 (1980).
W. Herbst & K. Hunger, Industrial Organ. Pigm. VCH, New York (1994) pp. 189–343.
Derwent Abstract An #84–078792, XP002054561 (1984).

*Primary Examiner*—Floyd D. Higel
*Attorney, Agent, or Firm*—Kevin I. Mansfield

[57] ABSTRACT

The present invention relates to colorant blends comprising (a) an azo component, which is a salt of a salt-forming azo pigment of the formula $$A\text{—}N\text{=}N\text{—}B,$$

wherein A is the residue of a diazo component and B is the residue of a coupling component; and (b) a second component, which is an opaque 1,4-diketo-3,6-diaryl-pyrrolo[3,4-c]pyrrole pigment. The colorant blends are especially useful in coating compositions, such as paints.

24 Claims, No Drawings

COLORANT BLENDS CONTAINING A SALT-FORMING AZO PIGMENT AND A PYRROLOPYRROLE PIGMENT

This is a continuation of application Ser. No. 08/475,131 filed on Jun. 7, 1995, abandoned which is a continuation-in-part of application Ser. No. 08/387,145 filed on Jan. 24, 1995, which is now abandoned.

The present invention relates to colorant blends comprising (a) an azo component, which is a salt of a salt-forming azo pigment of the formula

wherein A is the residue of a diazo component and B is the residue of a coupling component; and (b) a second component, which is an opaque 1,4-diketo-3,6-diarylpyrrolo[3,4-c]pyrrole (DPP) pigment.

Pigments that are suitable for use as the azo component are well-known in the pigment art and are described, for example, in the *Colour Index*, International, Third Edition (1971), including the Fourth Revision (1992), which is published by the Society of Dyers and Colorists.

In particular, suitable azo components are salts of the pigments typically prepared by a reaction sequence of diazotization and coupling wherein a diazotizable aromatic amine, which is referred to as the diazo component, is combined with a coupling component, which is typically an activated aromatic compound or a compound containing an activated methylene group. The diazo coupling reaction is well-known to the organic chemist and is described in Willy Herbst et al, *Industrial Organic Pigments*, VCH (1994) pages 189–343, along with suitable diazo and coupling components and important pigments suitable for use as the azo component of the present colorant blends.

The diazo component is preferably a diazotizable aromatic amine sulfonic or carboxylic acid, for example, an amino-substituted benzene, toluene or naphthalene which is also substituted by a water-solubilizing group, a sulfonic acid group, a carboxylic acid group, or a salt form thereof.

In general, the water-solubilizing substituent is any group capable of forming a water-soluble salt. In particular, the water-solubilizing substituent is an acidic substituent, such as the carboxylic acid or sulfonic acid group mentioned above, or a salt form thereof, in particular, a water-solubilizing salt form, especially an alkali metal salt, such as a sodium or potassium salt.

In general, suitable coupling components are activated aromatic compounds or compounds that contain an activated methylene group which compounds are capable of coupling with the diazotized aromatic amine, especially (a) 2-hydroxynaphthalene compounds of the formula

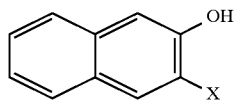

wherein X is H, —COOH, —SO$_3$H, an amide residue of the formula

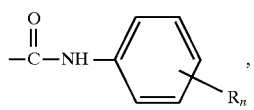

or a sulfonamide residue of the formula

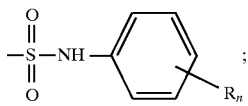

wherein R is alkyl, for example methyl or ethyl; alkoxy, for example methoxy or ethoxy; halogen, especially chlorine; nitro; or a 5- or 6- membered heterocycle condensed to the phenyl ring; and wherein n is 0 to 3; and (b) various pyrazolone derivatives having activated methylene groups, especially 1-phenyl-3-methyl-5-pyrazolone, 1-phenyl-3-carbethoxy-5-pyrazolone or one of their derivatives.

The coupling component may also contain a water-solubilizing substituent.

Preferred coupling components are those described under (a).

Both the diazo and coupling components are unsubstituted or substituted by one or more customary substituents, for example, halogen, especially chlorine; hydroxy and ether derivatives thereof; nitro; alkyl, especially C$_1$–C$_4$alkyl, for example, methyl and ethyl; alkoxy, especially C$_1$–C$_4$alkoxy, for example, methoxy and ethoxy; —COOH and salts and esters thereof; —SO$_3$H and salts and esters thereof, carboxamides or sulfonamides, especially N-aryl-substituted carboxamides or sulfonamides, for example N-phenyl-substituted carboxamides or sulfonamides; which customary substituents are unsubstituted or further substituted, especially in the alkyl, alkoxy or aryl groups, by additional customary substituents, for example, trifluoromethyl, which is considered to be a methyl substituent which is further substituted by three fluorines, or 2,4-dichlorophenyl, which is considered to be a phenyl substituent which is further substituted by two chlorines.

Suitable diazo components include 2-amino-4-chloro-5-methylbenzenesulfonic acid, 2-aminonaphthalene-1-sulfonic acid, 2-amino-4-methyl-5-chlorobenzenesulfonic acid, 2-amino-5-methylbenzenesulfonic acid, 2-amino-4-methylbenzenesulfonic acid, 2-methyl-4-aminobenzenesulfonic acid, 2-chloro-5-aminobenzenesulfonic acid, 4-aminobenzenesulfonic acid and 2-amino-4-ethyl-5-chlorobenzenesulfonic acid.

Suitable coupling components include 2-naphthol, 3-hydroxy-2-naphthoic acid, 2-hydroxy-3-naphthanilide, including 2-hydroxy-3-naphth-2'-methylanilide, 2-hydroxy-3-naphth-2'-methoxyanilide, 2-hydroxy-3-naphth-2'-ethoxyanilide, 2-hydroxy-3-naphth-3'-nitroanilide, 2-hydroxy-3-naphth-4'-chloroanilide, 2-hydroxy-3-naphth-4'-methoxyanilide, 2-hydroxy-3-naphth-4'-ethoxyanilide, 2-hydroxy-3-naphth-2',4'-dimethylanilide, 2-hydroxy-3-naphth-2'-methyl-5'-chloroanilide, 2-hydroxy-3-naphth-2'-methoxy-5'-chloroanilide, 2-hydroxy-3-naphth-2',5'-dimethoxyanilide 2-hydroxy-3-naphth-2',4'dimethoxy-5'-chloroanilide, 2-hydroxy-3-naphth-2',5'-dimethoxy-4'-chloroanilide, and the corresponding 2-hydroxy-3-naphthsulfonanilides.

Suitable salts of the salt-forming azo components include all metal and ammonium salts. Especially suitable metal salts include alkali metal salts, alkaline earth metal salts, and transition metal salts, such as Mn. The calcium, barium, and strontium salts of the azo components are especially suitable salts. In general, the salt is chosen such that the azo component is insoluble in the medium that it will be incorporated into.

In particular, azo pigments suitable as the azo component of the present colorant blends include those classified as azo pigment lakes by those skilled in the art, in particular red or orange azo pigment lakes. Specific pigments that are useful as the azo component include the C.I. Pigment Reds and the C.I. Pigment Oranges, including P.R. 48, P.R. 48:1, P.R. 48:2, P.R. 48:3, P.R. 48:4, P.R. 48:5, P.R. 49, P.R. 49:1, P.R. 49:2, P.R. 49:3, P.R. 50:1, P.R. 51, P.R. 52:1, P.R. 52:2, P.R. 53, P.R. 53:1, P.R. 53:3, P.R. 57:1, P.R. 58:2, P.R. 58:4, P.R. 60:1, P.R. 63:1, P.R. 63:2, P.R. 64, P.R. 64:1, P.R. 66, P.R. 67, P.R. 68, P.R. 151, P.R. 200, P.R. 237, P.R. 239, P.R. 240, P.R. 243, P.R. 247, P.R. 247:1, P.O. 17, P.O. 17:1, P.O. 19 and P.O. 46; wherein the number indicates the Colour Index designation by which the azo component is commonly known.

Particularly useful azo components include salts of the pigments prepared by the diazo coupling of (A) 2-amino-4-chloro-5-methylbenzenesulfonic acid with 3-hydroxy-2-naphthoic acid (C.I. Pigment Red 48), (B) 2-aminonaphthalene-1-sulfonic acid with 2-naphthol (C.I. Pigment Red 49), (C) 2-amino-4-methyl-5-chlorobenzenesulfonic acid with 3-hydroxy-2-naphthoic acid (C.I. Pigment Red 52), (D) 2-amino-4-methyl-5-chlorobenzenesulfonic acid with 2-naphthol (C.I. Pigment Red 53), (E) 2-amino-5-methylbenzenesulfonic acid with 3-hydroxy-2-naphthoic acid (C.I. Pigment Red 57), (F) 2-amino-4-ethyl-5-chlorobenzenesulfonic acid with 2-naphthol (C.I. Pigment Orange 46). Especially the barium, calcium, manganese, magnesium and strontium salts of these azo compounds.

Particularly useful colorant blends are those wherein the azo component is a red or orange azo pigment lake and the second component is an opaque DPP pigment, including mixtures and solid solutions containing a DPP pigment. If it is desired to maintain the color of the pigment blend upon exposure to light and/or weather, the azo component should have nearly the same hue as the second component.

DPP pigments useful as the second component are well-known in the pigments art and are described, for example, in U.S. Pat. Nos. 4,579,949 and 4,415,685, which are here incorporated by reference. DPP pigments are also known in the pigments art as 3,6diaryl-1,4-diketopyrrolo[3,4-c] pyrrole pigments and have been described in the chemical literature as 3,6-diaryl-1,4-diketo-2,5-dihydro-pyrrolo[3,4-c]pyrrole compounds. Preferred DPP components include diphenyl-DPP, di(4-chlorophenyl)-DPP, di(4-tertbutylphenyl)-DPP, di(3-cyanophenyl)-DPP, di(4-cyanophenyl)-DPP, di(biphenyl-4-yl)-DPP and di(4-methylphenyl)-DPP, di(3,4-dichlorophenyl)-DPP.

Opaque solid solution pigments containing a DPP component are also useful as the second component of the present colorant blends. Such solid solution pigments are known in the art and are disclosed, for example, in U.S. Pat. Nos. 4,810,304 and 4,783,540, and 5,457,203, and 5,472,476, and 5,529,623, and in U.S. patent application Ser. No. 08/314,018 which are here incorporated by reference.

According to the present invention, the azo component and second component are combined in any proportions. In general, the weight ratio of the azo component to the second component is from 5:95 to 60:40 in the colorant blends, in particular from 10:90 to 50:50, more specifically from 10:90 to 25:75.

Specific colorant blends that are particularly useful include those colorant blends having an azo component/second component ratio of from 10:90 to 50:50 with the following combinations of azo component/second component: P.R. 53:1/unsubstituted DPP; P.R. 53:3unsubstituted DPP; P.R. 53:1/di(4-chlorophenyl)-DPP; P.R. 48:5/di-(4-chlorophenyl)-DPP, P.R. 48:1/unsubstituted DPP; P.R. 48:4/di(biphenyl-4-yl)-DPP; P.R. 48:2/di(biphenyl-4-yl)-DPP; P.R. 48:3/unsubstituted DPP; P.R. 48:5/unsubstituted DPP; P.R. 49:1/di(4-chlorophenyl)-DPP; P.R. 49:1/di(biphenyl-4-yl)-DPP; P.R. 49:2/di-(biphenyl-4-yl)-DPP; P.R. 49:2/di(4-chlorophenyl)-DPP; P.R. 57:1/di(biphenyl-4-yl)-DPP.

The colorant blends of the present invention are characterized by greater than additive lightfastness and weatherfastness than would be expected based on the known properties of the individual components. Thus, $\Delta E_{blend}$ is less than $\Delta E_{calc}$ for the present colorant blends; wherein $\Delta E_{blend}$ is the observed $\Delta E$ value of the colorant blend, and $\Delta E_{calc}$ is the color difference calculated according to the formula: $\Delta E_{calc} = (\Delta E_{azo})(X_{azo}) + (\Delta E_{sec})(X_{sec})$, wherein $(\Delta E_{azo})$ and $(\Delta E_{sec})$ are the observed $\Delta E$ values for the azo component and the second component, respectively, and $(X_{azo})$ and $(X_{sec})$ are the weight fraction of the azo component and second component, respectively, in the colorant blend.

The hue of the azo component and the second components are preferably as close as possible. In particular, the hue of the second component is preferably within ±5 units of the hue of the azo component on the CIE Lch scale. Preferably, the hue of the azo component is within ±3 units of the second component, most preferably within ±2 units. Such blends show excellent lightfastness and weatherfastness properties.

The CIE Lch system is well-known in the arts relating to colorants, for example the dye and pigments industries. According to the CIE Lch system, every shade is broken down into three measurable components: the L component, which is a measure of lightness, the c component, which is a measure of chroma and the h component which is a measure of hue. Instrumentation for measuring the Lch values is well-known and is commercially available.

Thus, the present invention also relates to a method of selecting pigments to be blended in a colorant blend consisting of an azo component and a second component, which comprises selecting a second component having a hue within 5 units on the CIE Lch scale of the hue of the azo component.

The present invention further relates to a method of preparing a colorant blend which comprises blending an azo component and a second component, wherein the second component has a hue within ±5 units on the CIE Lch scale of the hue of the azo component. Preferably the hues are within ±3 units, most preferably within ±2 units.

Although this invention generally relates to colorant blends wherein the azo and second components have hues within ±5 units, certain colorant blends with components having a higher hue difference, for example ±8 or ±10 units, also have excellent fastness properties wherein $\Delta E_{blend}$ is less than 3. For example, colorant blends consisting essentially of Pigment Red 52:2 and di(4-chlorophenyl)-DPP possess excellent fastness properties.

The colorant blends are prepared by methods known in the art for preparing blends of pigment colorants, for example, by simple dry blending and wet blending techniques, preferably by a dry blending technique. For example, the azo component and the second component are blended together by known dry or wet blending techniques and then dispersed, or, the azo component and the second component are dispersed separately and then the dispersions are blended together into a single dispersion.

The present invention also relates to a method of coloring a high-molecular-weight organic material with a colorant blend described above. Generally, an effective pigmenting amount of the colorant blend is incorporated into the high-molecular-weight organic material to be pigmented, in particular by ball-milling, attritor and other dispersion-milling techniques. An effective pigmenting amount is any amount suitable to provide the desired color in the high-molecular-weight organic material. In particular, the colorant blends are used in an amount of 0.01 to 50% by weight, preferably 1 to 25% by weight, based on the weight of the high-molecular-weight organic material to be pigmented.

The pigmented, high-molecular-weight organic materials which are colored according to the present process are useful in a variety of applications. For example, the high-molecular-weight organic material can be used for the pigmentation of inks, lacquers and enamel coating compositions. The pigmented high-molecular-weight organic materials prepared according to the present invention are particularly useful for preparing automotive coating paints.

The high-molecular-weight organic materials which are colored according to the present process are, for example, cellulose ethers, cellulose esters, polyurethanes, polyesters, polyolefins, polystyrene, polyethers, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High-molecular-weight organic materials which are useful for heat-curable coatings or cross-linking, chemically-reactive coatings, are also colored according to the present process. Examples of the pigmented, high-molecular-weight organic materials which are used in coatings include acrylic, alkyd, epoxy, phenolic, melamine, urea, polyester, polyurethane, blocked isocyanate, triglycidyl isocyanurate, glycolurils, polyfunctional β-hydroxyalkylamides, benzoguanamine or cellulose ester resins, or combinations thereof. The pigmented, high-molecular-weight organic materials prepared according to the present process are also useful as air-drying or physically-drying coatings, for example, conventional lacquers such as those used in the cosmetics industry as nail varnishes, for example nitrocellulose lacquers.

The present process is particularly suitable for preparing coatings, for example, industrial coatings and those conventionally employed in the automobile industry, especially in thermosetting systems, such as acrylic/melamine resin, alkyd/melamine resin or thermoplastic acrylic resin systems. The inventive colorant blends are especially suitable for coloring solvent-borne automotive finishes.

The colorant blends are especially suitable for pigmenting the high-molecular-weight organic materials in solid colors, such as masstone colors. However, the colorant blends are also used in effect pigments, such as coated and uncoated micas.

Depending on the end use, it can be advantageous to add specific amounts of texture improving agents to the pigment. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/-maleate resins or fumaric acid/colophonium resins or polymeric dispersants. The texture improving agents are preferably added in amount of 0.1 to 30%, by weight, most preferably 2 to 15% by weight, based on the final product.

Generally, the inventive colorant blends are suitable for all pigment applications and are distinguished by excellent color strength and opacity, good fastness to light, weathering and heat, excellent purity and saturation, as well as by good dispersability when incorporated into plastics or coatings.

The following examples further illustrate the preferred embodiments of this invention. In these examples, all parts given are by weight unless otherwise noted. All color designations are based on the CIE Lch system.

EXAMPLE 1

50 parts of commercially available Pigment Red 48:3 (IRGALITE RED 2BSP from CIBA-GEIGY), having a hue component of 30.8, and 50 parts of commercially available di(4-chlorophenyl)-DPP (IRGAZIN RED DPP BO from CIBA-GEIGY), having a hue component of 29.6, the hues being reported in the CIE Lch system, are dry blended in a V-blender to yield a uniform 50:50 blend having a red color with a hue component of 29.7.

EXAMPLE 2

A masstone panel is prepared from an acrylic-melamine coating based on the following millbase formula:

| | |
|---|---|
| colorant blend from Example 1 | 98 parts |
| acrylic resin | 98 parts (69 parts non-volatile) |
| dispersant | 53.6 parts (29.5 parts non-volatile) |
| solvent | 100 parts |

The pigmented millbase is dispersed in a temperature-controlled attritor mill for three hours using steel media to yield a millbase dispersion.

A masstone paint is prepared by combining 36.5 parts of the millbase dispersion, 35 parts of acrylic resin, 42 parts alkylated melamine-formaldehyde resin, and 25 parts of a catalyst solution containing dodecylbenzenesulfonic acid as catalyst, N-propylamine and a U.V stabilizer. The masstone paint is then sprayed onto primed aluminum panels and baked for 30 minutes at 250° F. The panels are then exposed to simulated outdoor conditions using a Xenon Arc CI-65 Weather-O-Meter and a schedule similar to ASTM G26-70. Since the $\Delta E$ observed for Pigment Red 48:3 alone after 2000 hours exposure is 11.5, and the $\Delta E$ observed for di(4-chlorophenyl)-DPP alone after 2000 hours exposure is 0.8, the observed $\Delta E$ of 1.0 after 2000 hours exposure for the colorant blend of the present invention is much less than would be expected based on the observed $\Delta E$ values of the individual components.

EXAMPLE 3

The procedure of Example 2 is followed with a 35:65 colorant blend containing 35 parts of Pigment Red 48:3 and 65 parts di(4-chlorophenyl)-DPP. After 2000 hours exposure, a $\Delta E$ of 0.4 is observed.

EXAMPLE 4

The procedure of Example 2 is followed with a 25:75 colorant blend containing 25 parts of Pigment Red 48:3 and 75 parts di(4-chlorophenyl)-DPP. After 2000 hours of exposure a $\Delta E$ of 0.8 is observed.

EXAMPLE 5

The procedure of Example 2 is followed with a 10:90 colorant blend which contains 10 parts of Pigment Red 48:3 and 90 parts di(4-chlorophenyl)-DPP. After 2000 hours exposure a $\Delta E$ of 1.1 is observed.

EXAMPLE 6

The procedure of Examples 2, 4 and 5 are followed with colorant blends wherein the Pigment Red 48:3 is replaced with Pigment Red 48:2. After 2000 hours exposure, a ΔE of 1.8, 1.6 and 1.4 is observed with the 50:50 blend, the 25:75 blend and the 10:90 blend, respectively.

EXAMPLE 7

The procedure of Examples 2, 4 and 5 are followed with colorant blends wherein the Pigment Red 48:3 is replaced with Pigment Red 48:2 and the di(4-chlorophenyl)-DPP is replaced by di(biphenyl-4-yl)-DPP. After 2000 hours exposure, a ΔE of 1.2, 1.1 and 1.4 is observed for the masstone panels 50:50 blend, the 25:75 blend and the 10:90 blend, respectively.

EXAMPLE 8

The procedure of Examples 2, 4 and 5 are followed with colorant blends wherein the Pigment Red 48:3 is replaced with Pigment Red 52:2 and the di(4-chlorophenyl)-DPP is replaced by di(biphenyl-4-yl)-DPP. After 2000 hours exposure, a ΔE of 0.9, 0.7 and 0.6 is observed for the 50:50 blend, the 25:75 blend and the 10:90 blend, respectively.

EXAMPLE 9

The procedure of Examples 2 and 4 are followed with colorant blends wherein the Pigment Red 48:3 is replaced with Pigment Red 49:2 and the di(4-chlorophenyl)-DPP is replaced by di(biphenyl-4-yl)-DPP. After 2000 hours exposure, a ΔE of 0.3 and 0.4 is observed for the 50:50 blend and the 25:75 blend, respectively.

EXAMPLE 10

The procedure of Example 4 is followed with a colorant blend wherein the Pigment Red 48:3 is replaced with Pigment Red 57:1 and the di(4-chlorophenyl)-DPP is replaced by di(biphenyl-4-yl)-DPP. After 2000 hours exposure, a ΔE of 0.7 is observed for the 25:75 blend.

EXAMPLE 11

The procedure of Examples 2, 4 and 5 are followed with colorant blends wherein the Pigment Red 48:3 is replaced with Pigment Red 53:1 and the di(4-chlorophenyl)-DPP is replaced by unsubstituted DPP. After 2000 hours exposure, a ΔE of 1.7, 0.9 and 0.4 is observed for the 50:50 blend, the 25:75 blend and the 10:90 blend, respectively.

EXAMPLE 12

The procedure of Examples 2, 4 and 5 are followed with colorant blends wherein the Pigment Red 48:3 is replaced with the Sr salt of Pigment Red 53 and the di(4-chlorophenyl)-DPP is replaced by unsubstituted DPP. After 2000 hours exposure, a ΔE of 1.6, 1.0 and 0.5 is observed for the 50:50 blend, the 25:75 blend and the 10:90 blend, respectively.

EXAMPLE 13

The procedure of Examples 2, 4 and 5 are followed with colorant blends wherein the Pigment Red 48:3 is replaced with Pigment Red 49:1. After 2000 hours exposure, a ΔE of 1.4, 1.4 and 1.9 is observed for the 50:50 blend, the 25:75 blend and the 10:90 blend, respectively.

EXAMPLE 14

The procedure of Examples 2, 4 and 5 are followed with colorant blends wherein the Pigment Red 48:3 is replaced with Pigment Red 48:1. After 2000 hours exposure, a ΔE of 1.6, 0.4 and 0.8 is observed for the 50:50 blend, the 25:75 blend and the 10:90 blend, respectively.

EXAMPLE 15

The procedure of Examples 2, 4 and 5 are followed with colorant blends wherein the Pigment Red 48:3 is replaced with Pigment Red 48:5 (Mg salt). Colorant blends with very good lightfastness and weatherfastness are obtained.

EXAMPLE 16

The procedure of Examples 2, 4 and 5 are followed with colorant blends wherein the Pigment Red 48:3 is replaced with Pigment Red 53:1. Colorant blends with very good lightfastness and weatherfastness are obtained.

EXAMPLE 17

The procedure of Examples 2, 4 and 5 are followed with colorant blends wherein the Pigment Red 48:3 is replaced with Pigment Red 48:1 and the di(4-chlorophenyl)-DPP is replaced by unsubstituted DPP. Colorant blends with very good lightfastness and weatherfastness are obtained.

EXAMPLE 18

The procedure of Examples 2, 4 and 5 are followed with colorant blends wherein the di(4-chlorophenyl)-DPP is replaced by unsubstituted DPP. Colorant blends with very good lightfastness and weatherfastness are obtained.

EXAMPLE 19

The procedure of Examples 2, 4 and 5 are followed with colorant blends wherein the Pigment Red 48:3 is replaced with Pigment Red 48:5 and the di(4-chlorophenyl)-DPP is replaced by unsubstituted DPP. Colorant blends with very good lightfastness and weatherfastness are obtained.

EXAMPLE 20

The procedure of Examples 2, 4 and 5 are followed with colorant blends wherein the Pigment Red 48:3 is replaced with Pigment Orange 19 and the di(4-chlorophenyl)-DPP is replaced by di(4-tert-butylphenyl)-DPP. Colorant blends with very good lightfastness and weatherfastness are obtained.

EXAMPLE 21

The procedure of Examples 2, 4 and 5 are followed with colorant blends wherein the Pigment Red 48:3 is replaced with Pigment Orange 46 and the di(4-chlorophenyl)DPP is replaced by opaque di(3-cyanophenyl)-DPP. Colorant blends with very good lightfastness and weatherfastness are obtained.

EXAMPLE 22

The procedure of Examples 2, 4 and 5 are followed with colorant blends wherein the Pigment Red 48:3 is replaced with Pigment Red 48:4 and the di(4-chlorophenyl)-DPP is replaced by di(biphenyl-4-yl)-DPP. Colorant blends with very good lightfastness and weatherfastness are obtained.

EXAMPLE 23

The procedure of Examples 2, 4 and 5 are followed with colorant blends wherein the di(4-chlorophenyl)-DPP is replaced by an opaque red solid solution consisting of 40 parts of unsubstituted DPP and 60 parts of di(4-chlorophenyl)-DPP. Colorant blends with very good lightfastness and weatherfastness are obtained.

EXAMPLE 24

Example 27 is repeated except that the Pigment Red 48:3 is replaced by the following azo components: P.R. 48:5 and P.R. 53:1. In each instance, a colorant blend which shows very good lightfastness and weatherfastness is obtained.

EXAMPLE 25

The procedure of Examples 2, 4 and 5 are followed with colorant blends wherein the P.R. 48:3 is replaced with P.R. 48:1 and the di(4-chlorophenyl)-DPP is replaced by an opaque red solid solution consisting of 32 parts unsubstituted DPP, 48 parts di(4-chlorophenyl) DPP and 20 parts 2,9-dichloroquinacridone. Colorant blends with very good lightfastness and weatherfastness are obtained.

EXAMPLE 26

The procedure of Example 29 is repeated except that the Pigment Red 48:3 is replaced by the following azo components: P.R. 48:5 and P.R. 53:1. In each instance, a colorant blend which shows very good lightfastness and weatherfastness is obtained.

EXAMPLE 27

The procedure of Examples 2, 4 and 5 are followed with colorant blends wherein the Pigment Red 48:3 is replaced with Pigment Red 48:4. After 2000 hours exposure, a $\Delta E$ of 1.9, 1.1, and 0.2 is observed for the 50:50 blend, the 25:75 blend and the 10:90 blend, respectively.

EXAMPLE 28

50:50 tints are prepared by standard procedures with $TiO_2$ and the colorant blends used in Examples 4 and 5. After 2000 hours of exposure, a $\Delta E$ of 3.4 and 2.1 is observed for the 25:75 and 10:90 blends, respectively.

EXAMPLE 29

A 50:50 tint with the 10:90 colorant blend of Example 27 and $TiO_2$ is prepared by standard procedures. After 2000 hours of exposure, a $\Delta E$ of 1.5 is observed.

EXAMPLE 30

A 50:50 tint with the 25:75 colorant blend of Example 27 and $TiO_2$ is prepared by standard procedures. After 2000 hours of exposure, a $\Delta E$ of 2.8 is observed.

EXAMPLE 31

Millbase A—100 parts of a millbase is prepared by combining 28 parts of di(4-chlorophenyl)-DPP, 19 parts of acrylic resin, 9 parts of dispersant and 44 parts of xylene.

Millbase B—100 parts of a millbase is prepared by combining 16 parts of Pigment Red 48:3, 27 parts of acrylic resin, 5 parts of dispersant and 52 parts of xylene.

Masstone Paints

I. 137.3 parts of a masstone paint containing 10 parts of Pigment Red 48:3 and 90 parts of di(4-chlorophenyl)-DPP is prepared by combining 36.6 parts of millbase A, 7.1 parts of millbase B, 37.4 parts of acrylic resin (68% solids), 28.1 parts of alkylated melamine-formaldehyde resin and 28.1 parts of a catalyst/stabilizer solution. Weatherometer testing yields results similar to those obtained in Example 5.

II. 137.6 parts of a masstone paint containing 25 parts of Pigment Red 48:3 and 75 parts of di(4-chlorophenyl)-DPP is prepared by combining 30.1 parts of millbase A, 17.5 parts of millbase B, 34.5 parts of acrylic resin, 27.7 parts of alkylated melamine-formaldehyde resin and 27.8 parts of a catalyst/stabilizer solution. Weatherometer testing yields results similar to those obtained in Example 4.

III 137.9 parts of a masstone paint containing 50 parts of Pigment Red 48:3 and 50 parts of di(4-chlorophenyl)-DPP is prepared by combining 19.6 parts of millbase A, 34.3 parts of millbase B, 29.8 parts of acrylic resin, 27.1 parts of alkylated melamine-formaldehyde resin and 27.1 parts of a catalyst/stabilizer solution. Weatherometer testing yields results similar to those obtained in Example 2.

EXAMPLE 32

Solvent-based Mica Paint Formulation

Mica Base 746 parts of a mica base is prepared by mixing 251 parts of pearlescent mica with 251 parts of acrylic resin and 244 parts of butyl acetate until lump free.

Mica Paint Formulation

A mica basecoat paint formulation is prepared by mixing 128 parts of the pigmented millbase dispersion prepared in Example 2, 70 parts of the mica base, 20.8 parts of a nonaqueous dispersion resin, 30.6 parts of melamine resin, 2.6 parts of UV screener and 3.5 parts of catalyst. The final mica basecoat paint is prepared by diluting with xylene to a spray viscosity of about 20 seconds with a #4 Ford Cup.

The mica basecoat paint is sprayed onto aluminum panels. After a flash period of about 3 minutes, an acrylic-melamine clear topcoat is applied on top of the color basecoat. The panels are then allowed to flash for 10 minutes and then baked for 30 minutes at 130° C.

The coating possesses attractive color with very good lightfastness and weatherfastness properties. Similar attractive panels are obtained using the colorant blends of Examples 3–27 in place of the pigment of Example 1 in the pigmented millbase dispersion.

EXAMPLE 33

A powder coating is prepared by pre-blending 8 parts of the colorant blend of Example 1 with 84 parts of polyester resin, 6.4 parts of a triglycidyl isocyanurate cross-linking agent, 1 part of flow control agent and 0.5 parts of benzoin. The pre-blended mixture is then fed into a twin screw extruder. The extrudate is cooled, ground and sieved through a 120 mesh screen to yield the powder coating.

The powder coating is sprayed onto aluminum panels by standard methods and then cured at 200° C. for 15 minutes. The coating possesses attractive color with very good lightfastness and weatherfastness properties. Similar attractive panels are obtained using the colorant blends of Examples 3–27 in place of the pigment of Example 1.

EXAMPLE 34

A pigmented, flexible polyvinyl chloride sheet is prepared by standard techniques from a mixture containing 1 part of the colorant blend of Example 1, 100 parts of PVC resin, 100 parts of plasticizer, 18 parts of calcium carbonate and 3 parts of stabilizer. The resulting flexible PVC sheet shows very little specking or streaking. Similar PVC sheets are obtained when the colorant blends of Examples 3–27 replace the colorant blend of Example 1.

We claim:

1. A colorant blend, which contains (a) an azo component, which azo component is a salt of a salt-forming azo pigment of the formula

A—N=N—B, wherein A is the radical of a diazo component and B is the radical of a coupling component; and (b) a second component, which second component is an opaque 1,4-diketo-3,6-diarylpyrrolo (3,4-c)pyrrole pigment having a hue within ±5 units of the azo component.

2. A colorant blend of claim 1 wherein the diazo component is a diazotizable amine containing an acidic substituent, or a salt form thereof.

3. A colorant blend of claim 2 wherein the diazo component is an amino-substituted benzene, toluene or naphthalene which is further substituted by a water-solubilizing group.

4. A colorant blend of claim 3 wherein the coupling component is a 2-hydroxynaphthalene compound of the formula

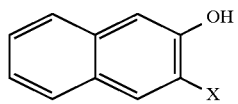

wherein X is H, —COOH, —SO$_3$H, an amide residue of the formula

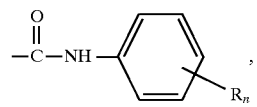

or a sulfonamide radical of the

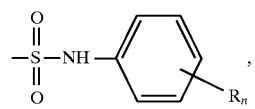

wherein R is alkyl, for example; alkoxy, halogen, nitro, or a 5- or 6- membered heterocycle condensed to the phenyl ring; and wherein n is 0 to 3.

5. A colorant blend of claim 1 wherein the colorant blend is characterized by greater than additive lightfastness and weatherfastness than would be expected based on the lightfastness and weatherfastness properties of the individual components.

6. A colorant blend of claim 5 wherein the diazo component is 2-amino-4-chloro-5-methylbenzenesulfonic acid, 2-aminonaphthalene-1-sulfonic acid, 2-amino-4-methyl-5-chlorobenzenesulfonic acid, 2-amino-5-methylbenzenesulfonic acid, 2-amino-4-methylbenzenesulfonic acid, 2-methyl-4-aminobenzenesulfonic acid, 2-chloro-5-aminobenzenesulfonic acid, 4-aminobenzenesulfonic acid or 2-amino-4-ethyl-5-chlorobenzenesulfonic acid.

7. A colorant blend of claim 5 wherein the coupling component is 2-naphthol, 3-hydroxy-2-naphthoic acid, a 2-hydroxy-3-naphthanilide, 2-hydroxy-3-naphth-2'-methylanilide, 2-hydroxy-3-naphth-2'-methoxyanilide, 2-hydroxy-3-naphth-2'-ethoxyanilide, 2-hydroxy-3-naphth-3'-nitroanilide, 2-hydroxy-3-naphth-4'-chloroanilide, 2-hydroxy-3-naphth-4'-methoxyanilide, 2-hydroxy-3-naphth-4'-ethoxyanilide, 2-hydroxy-3-naphth-2',4'dimethylanilide, 2-hydroxy-3-naphth-2'-methyl-5'-chloroanilide, 2-hydroxy-3-naphth-2'-methoxy-5'-chloroanilide, 2-hydroxy-3-naphth-2',5'-dimethoxyanilide, 2-hydroxy-3-naphth-2',4'-dimethoxy-5'-chloroanilide, 2-hydroxy-3-naphth-2',5'-dimethoxy-4'-chloroanilide, and the corresponding 2-hydroxy-3-naphthsulfonanilides.

8. A colorant blend of claim 7 wherein the diazo component is 2-amino-4-chloro-5-methylbenzenesulfonic acid, 2-aminonaphthalene-1-sulfonic acid, 2-amino-4-methyl-5-chlorobenzenesulfonic acid, 2-amino-5-methylbenzenesulfonic acid, 2-amino-4-methylbenzenesulfonic acid, 2-methyl-4-aminobenzenesulfonic acid, 2-chloro-5-aminobenzenesulfonic acid, 4-aminobenzenesulfonic acid or 2-amino-4-ethyl-5-chlorobenzenesulfonic acid.

9. A colorant blend of claim 5 wherein the azo component is an alkali metal, alkaline earth metal, or a transition metal, salt.

10. A colorant of claim 2, wherein the acidic substituent is a sulfonic or carboxylic acid group, or a salt form thereof.

11. A colorant blend of claim 5 wherein the second component is a 1,4-diketo-3,6-diarylpyrrolo (3,4-c)pyrrole pigment or a solid solution containing a 1,4-diketo-3,6-diarylpyrrolo(3,4-c)pyrrole pigment.

12. A colorant blend which consists essentially of Pigment Red 52:2 and 1.4-diketo-3,6-bis(4-chlorophenyl)pyrrole(3,4-c) pyrrole, wherein the colorant blend is characterized by greater than additive lightfastness and weatherfastness than would be expected based on the properties of the individual components.

13. A colorant blend of claim 11 wherein the second component is selected from the group consisting of 1,4-diketo-3.6-diphenylpyrrolo(3,4-c)pyrrole, 1,4-diketo-3,6-di(4-chloro-phenyl)pyrrolo(3,4-c)pyrrole, 1,4-diketo-3,6-di(4-tertbutylphenyl)pyrrolo(3,4-c) pyrrole 1,4-diketo-3,6-di(3-cyanophenyl)pyrrolo(3,4-c)pyrrole, 1,4-diketo-3,6-di(4-cyanophenyl) pyrrolo(3,4-c)pyrrole, 1,4-diketo-3,6-di(biphenyl-4-yl)pyrrolo(3,4-c)pyrrole, 1.4-diketo-3,6-di(4-methylphenyl)pyrrolo(3,4-c)-pyrrole and 1,4-diketo-3,6-di(3,4-dichlorophenyl)pyrrolo(3,4-c)pyrrole; including solid solution above-identified compounds.

14. A colorant blend of claim 5 wherein the weight ratio of the azo component to the second component is from 5:95 to 60:40.

15. A colorant blend of claim 5 wherein the hue of the second component is within ±3 units of the hue of the azo component.

16. A colorant blend of claim 14 wherein the weight ratio is from 10:90 to 25:75.

17. A method of preparing a colorant blend according to claim 5, which comprises blending an azo component and a second component, wherein the second component has a hue within ±5 units, of the hue of the azo component.

18. A method of preparing a colorant blend of claim 5, wherein the azo component and the second component are blended together by a dry or wet blending technique and then dispersed, or, the azo component and the second component are dispersed separately and then the dispersions are blended together into a single dispersion.

19. A method of coloring a high-molecular-weight organic material with a colorant blend, which comprises incorporating a colorant blend of claim 5 into the high-molecular-weight organic material.

20. A method of claim 9, wherein the high-molecular-weight organic material is an automotive paint.

21. A colorant blend of claim 14 wherein the azo component is selected from Pigment Red 48, Pigment Red 48:1, Pigment Red 48:2, Pigment Red 48:3, Pigment Red 48:4, Pigment Red 48:5, Pigment Red 49, Pigment Red 49:1, Pigment Red 49:2, Pigment Red 49:3, Pigment Red 50:1, Pigment Red 51, Pigment Red 52:1, Pigment Red 52:2, Pigment Red 53, Pigment Red 53:1, Pigment Red 53:3, Pigment Red 57:1, Pigment Red 58:2, Pigment Red 58:4, Pigment Red 60:1, Pigment Red 63:1, Pigment Red 63:2, Pigment Red 64, Pigment Red 64:1, Pigment Red 66, Pigment Red 67, Pigment Red 68, Pigment Red 151, Pigment Red 200, Pigment Red 237, Pigment Red 239, Pigment Red 240, Pigment Red 243, Pigment Red 247, Pigment Red 247:1; Pigment Orange 17, Pigment Orange 17:1, Pigment Orange 19 and Pigment Orange 46.

22. A colorant blend of claim 1 wherein the coupling component is a pyrazolone derivative having an activated methylene group.

23. A colorant blend of claim 1 wherein the azo component is a monoazo or disazo pigment.

24. A colorant blend of claim 1 wherein the azo component/second component ratio is from 10:90 to 50:50 with the following combinations of azo component/second component: Pigment Red 53:1/1,4-diketo-3,6-diphenylpyrrolo(3,4-c)pyrrole; Pigment Red 53:3/1,4-diketo-3,6-diphenylpyrrolo (3,4-c)pyrrole; Pigment Red 53:1/1,4-diketo-3,6-di(4-chlorophenyl)pyrrolo(3,4-c)-pyrrole; Pigment Red 48:5/1,4-diketo-3,6-di(4-chlorophenyl)pyrrolo(3,4-c)pyrrole; Pigment Red 48:1/1,4-diketo-3,6-diphenylpyrrolo(3,4-c)pyrrole; Pigment Red 48:4/1,4-diketo-3,6-di (biphenyl-4-yl)-pyrrolo(3,4-c) pyrrole; Pigment Red 48:2/1,4-diketo-3,6-di(biphenyl-4-yl) pyrrolo(3,4-c) pyrrole; Pigment Red 48:3/1,4-diketo-3,6-diphenylpyrrolo(3,4-c)pyrrole; Pigment Red 48:5/1,4-diketo-3,6-diphenyl-pyrrolo(3,4-c)pyrrole; Pigment Red 49:1/1,4-diketo-3,6-di(4-chlorophenyl)pyrrolo(3,4-c) pyrrole; Pigment Red 49:1/1,4-diketo-3,6-di(biphenyl-4-yl) pyrrolo(3,4-c)pyrrole; Pigment Red 49:2/1,4-diketo-3,6-di (biphenyl-4-yl)pyrrolo(3,4-c)pyrrole; Pigment Red 49:2/1, 4-diketo-3,6-di(4-chlorophenyl)-pyrrolo (3,4-c)pyrrole; Pigment Red 57:1/1,4-diketo-3,6-di(biphenyl-4-yl)pyrrolo(3,4-c)pyrrole.

* * * * *